United States Patent Office 3,233,501
Patented Feb. 8, 1966

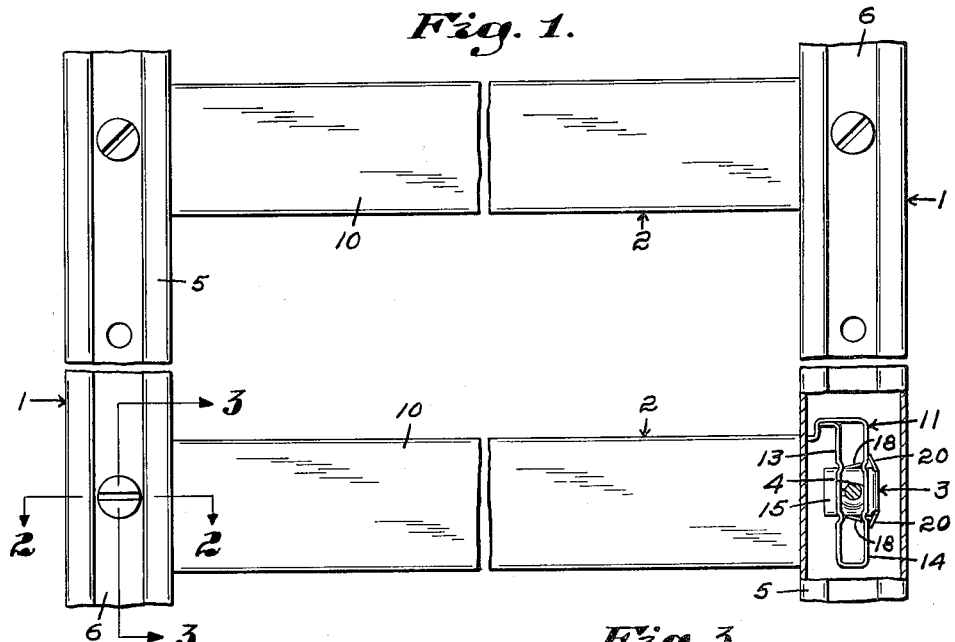
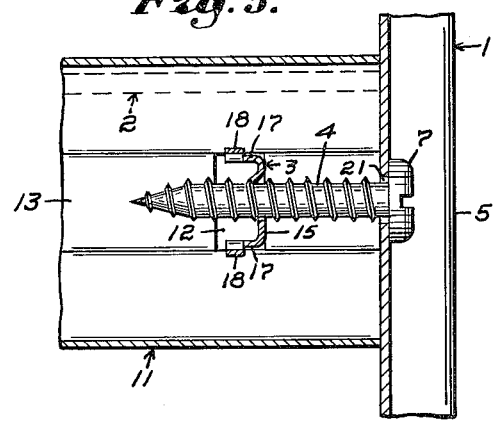
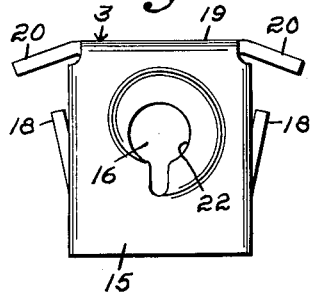
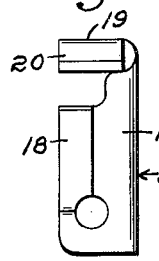
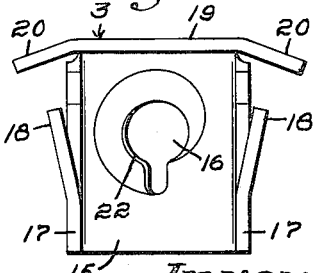
Inventor:
Harold S. van Buren Jr.,
by Walter S. Jones
Atty.

3,233,501
JOINT ASSEMBLY AND FASTENER FOR SAME
Harold S. van Buren, Jr., Cambridge, Mass., assignor to United-Carr Incorporated, a corporation of Delaware
Filed Feb. 4, 1963, Ser. No. 256,001
1 Claim. (Cl. 85—80)

This application relates to improvements in constructions such as may be used in assembling adjustable shelves to frames and also to an improved joint fastening means for connecting the shelves to the frames.

An object of the invention is to provide a joint construction which includes at least two members secured by a snap fastener attached to one member and another fastener member engaging the snap fastener and holding the other member in position.

Another object of the invention is to provide a simple, new snap fastener member to provide one of the fastener members of a joint fastener for securing two or more adjacent members in assembly.

In the drawings:

FIG. 1 is a broken front view partly in section showing a frame and shelf construction;

FIG. 2 is an enlarged section taken on the line 2—2 of FIG. 1;

FIG. 3 is an enlarged section taken on the line 3—3 of FIG. 1;

FIG. 4 is an enlarged view of the snap fastener member of the joint fastener;

FIG. 5 is an edge view of the fastener shown in FIG. 4; and

FIG. 6 is a view similar to FIG. 4 as viewed from the opposite side thereof.

While the invention illustrated is directed to the securing of shelves to supports it should be understood that the parts to be secured in assembly may represent any suitable article that has members that need to be assembled by some type of a joint fastener other than rivets, ordinary screws or bolts.

In the installation illustrated the joint fastener is of a type where one member is in the form of a snap fastener snapped into engagement with a member of the assembly and a second fastener member may be in the form of a screw or other suitable member that may pass through an aperture in the other member and engage with the snap fastener member.

With the above in mind there has been illustrated in FIGS. 1, 2, and 3 a structure which represents a shelving arrangement or cabinet for storing books or other articles, and preferably made of sheet metal. The specific construction illustrated includes upright members 1 and cross member shelves 2 secured together at adjacent portions by snap fastener members 3 and screw members 4. The upright members 1 may be of any suitable construction. In the drawings, FIG. 2 shows the cross section that is best suited for the particular installation in mind and includes a longitudinal face portion 5 with a longitudinal groove 6 to provide strength to the upright members 1 and receive the heads 7 of the screws in countersunk relation. A side face portion 8 (FIG. 2) is joined along one edge to the front faced portion 5 and has a longitudinal flange 9 which adds strength and stiffness to the upright member 1.

A shelf 2 is of thin sheet metal and has a front edge flange 10 and a hollow box-like construction 11 at opposite ends of the shelf extending from front to back and illustrated in end view at the lower right portion of FIG. 1. This box-like construction 11 strengthens the shelf and provides for proper holding of the snap fastener member 3 as shown in FIG. 2.

Each box-like portion 11 of the shelf 2 is provided with aligned apertures 12—12 in the spaced walls 13 and 14 (FIGS. 1 and 2) and receives the snap fastener member 3 in a direction crosswise to the box-like portion for the purposes hereinafter to be described.

The snap fastener member 3 is formed from a single piece of metal and has a back portion 15 provided with a screw receiving aperture 16 for receiving the screw 4. At opposite side edges of the back portion 15 there are provided side wing flanges 17—17 which extend away from the back portion and each is provided with a spring finger 18. At the third edge of the back portion 15 there is provided a support engaging flange 19 having bent end portions 20—20 for co-operation with the spring fingers 18—18 as will be described hereafter.

Assembly of the parts of the installation is relatively simple since it is only necessary to snap the desired number of snap fastener members 3 into the apertures 12—12 of the box-like portions 11 as shown in FIG. 1. It will be noted that the apertures 12—12 are relatively oblong in shape as shown in FIGS. 2 and 3 so that when the fastener members 3 are in place the fasteners cannot rotate relative to the box-like portion. When the fasteners are in position the spring finger portions 18—18 snap through one of the apertures 12 and engage behind the wall 14 of the box-like portion and co-operate with the yieldable portions 20—20 of the flange 19 to hold the fasteners 3 in place and grip opposite sides of the wall 14. The forward end of the fastener, which includes a portion of the plate portion 15 and the side wings 17, extends through the second aperture 12 in the wall 13 of the box-like portion and thus each fastener is securely held in position and cannot be accidentally rotated. Thereafter the shelves 2 may be joined to the upright members 1 by inserting the screws 4 through apertures 21 in the front face portion 5 and screwed into engagement with the screw receiving thread portions 22 of the fastener members 3, as shown in FIGS. 2 and 3.

Thus there has been provided an assembly which can be shipped in dis-assembled condition for easy assembling at the point of use and all that is necessary is a screwdriver, as far as tools are concerned. It will be noted that the fasteners are well-retained in position and may be assembled either by the manufacturer or the user and once assembled are rigidly held in place. Another advantage of the device is that the construction may be taken apart and reassembled very easily and it is unnecessary to dis-assemble the snap fasteners from the shelves.

While there has been illustrated an improved construction assembly and joint fastener construction as applied to such an article of manufacture as shelving cabinets it should be understood that the inventions are best defined by the following claim.

I claim:

A snap fastener member providing a part for a joint fastener such as for joining a metal shelf to a frame member, said snap fastener member having a generally rectangular shaped back portion provided with an aperture and including a thread engaging means for receiving a threaded portion of a cooperating part of the joint fastener, side wings joined to opposed edges of said back portion and extending generally parallel to the axis of said aperture, said side wings each having a spring finger portion struck therefrom, each of said finger portions having a free end facing toward the plane of an end edge of said back portion, and a support engaging spring flange extending from the same end edge of said back portion and generally perpendicular to said back portion, portions of said flange extending over said side wings and being inclined toward the free ends of said finger portions for cooperation with said fingers to grip a support between said flange and said fingers.

References Cited by the Examiner

UNITED STATES PATENTS

| | | | |
|---|---|---|---|
| 2,110,959 | 3/1938 | Lombard | 85—5 |
| 2,244,975 | 6/1941 | Tinnerman | 85—5 |
| 2,283,122 | 5/1942 | Murphy | 85—50 |
| 2,883,228 | 4/1959 | Roberts | 151—41.75 X |
| 3,110,372 | 11/1963 | Pierce et al. | 151—51.75 X |

EDWARD C. ALLEN, *Primary Examiner.*

RICHARD W. COOKE, Jr., *Examiner.*